United States Patent [19]

Inoguchi et al.

[11] 4,421,699
[45] Dec. 20, 1983

[54] METHOD FOR PRODUCING A CORDIERITE BODY

[75] Inventors: Kazuhiro Inoguchi, Okazaki; Tomohiko Nakanishi, Kariya; Mitsuru Asano, Okazaki, all of Japan

[73] Assignee: Nippon Soken, Inc., Nishio, Japan

[21] Appl. No.: 250,151

[22] Filed: Apr. 2, 1981

[30] Foreign Application Priority Data

Apr. 4, 1980 [JP] Japan .................................. 55-45018

[51] Int. Cl.$^3$ ............................................. C04B 35/18
[52] U.S. Cl. .................................. 264/56; 264/209.1; 501/9; 501/118
[58] Field of Search ...................... 264/209, 56; 501/9, 501/118

[56] References Cited

U.S. PATENT DOCUMENTS 3,885,977  5/1975  Lachmon .............................. 106/62

Primary Examiner—John A. Parrish
Attorney, Agent, or Firm—Cushman, Darby & Cushman

[57] ABSTRACT

A method for producing a cordierite body having high crystallinity and exhibiting excellent low thermal expansion property in a specific direction at a relatively low firing temperature comprises the steps of mixing and kneading a batch raw material containing halloysite particles and plate-shaped talc particles, anisostatically forming the batch raw material into a formed body to impart a planar orientation to the plate-shaped talc particles within the batch raw material and drying and firing the formed body.

13 Claims, 3 Drawing Figures

METHOD FOR PRODUCING A CORDIERITE BODY

BACKGROUND OF THE INVENTION

The present invention relates to a method for producing a cordierite body.

Cordierite ($2MgO.2Al_2O_3.5SiO_2$) has an excellent low thermal expansion and is a suitable material to produce a product which is required to have thermal shock resistance when subjected to repeated cycles of rapid increases and decreases in temperature, for example a honeycomb structured catalyst support for purifying exhaust gas.

The coefficient of thermal expansion of cordierite has been generally known as $26.0 \times 10^{-7}/°C.$ in the range of 25° to 1000° C.

Recently, various studies have been made to obtain a cordierite body having more excellent thermal shock resistance. As a result, it has been found that by eliminating alkali metals such as natrium and kalium, alkaline-earth metals such as calcium and other impurities having adverse effect on the low thermal expansion of cordierite, from the material, a cordierite body having a thermal expansion property as low as $17.0 \times 10^{-7}/°C.$ in the range of 25° to 1000° C. can be obtained.

Furthermore, it has been reported that by orienting the anisotropic property of the cordierite crystals, cordierite bodies having coefficients of thermal expansion of less than $11.0 \times 10^{-7}/°C.$ in the range of 25° to 1000° C. in at least one direction can be obtained.

For example, one of the methods for orienting the cordierite crystals to reduce the thermal expansion of the cordierite body in at least one direction is shown in U.S. Pat. No. 3,885,977.

In U.S. Pat. No. 3,885,997, there is stated that a cordierite body having a thermal expansion as low as $11.0 \times 10^{-7}/°C.$ is obtained by forming a batch raw material containing plate-shaped particles, particularly kaolinite particles by such a means as to impart a planar orientation to the plate-shaped particles, for example extrusion forming, drying and firing the obtained formed body.

One object of the present invention is to provide a cordierite body having a lower thermal expansion property, and more particularly to provide a cordierite body having remarkably low thermal expansion property in a specific direction.

Another object of the present invention is to provide a cordierite body having the above described property by firing at a relatively low temperature.

Still another object of the present invention is to provide a cordierite honeycombed structure having excellent thermal shock resistance, particularly to provide a honeycombed structure for use as a catalyst support for purifying exhaust gases.

Further object of the present invention is to provide a cordierite body having the desired precise shape and size.

DESCRIPTION OF THE DRAWINGS

Other objects and advantages of the invention will become apparent from the following detailed description of the present invention with reference to the accompanying drawings wherein.

SUMMARY OF THE INVENTION

Figure 1:
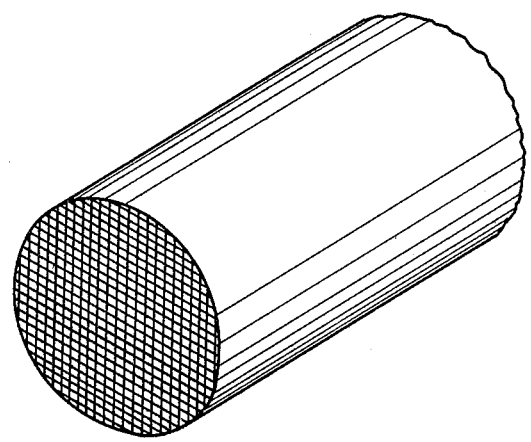
FIG. 1 is a perspective view of a honeycombed structure which is obtained by the method of the present invention.
Figure 2:
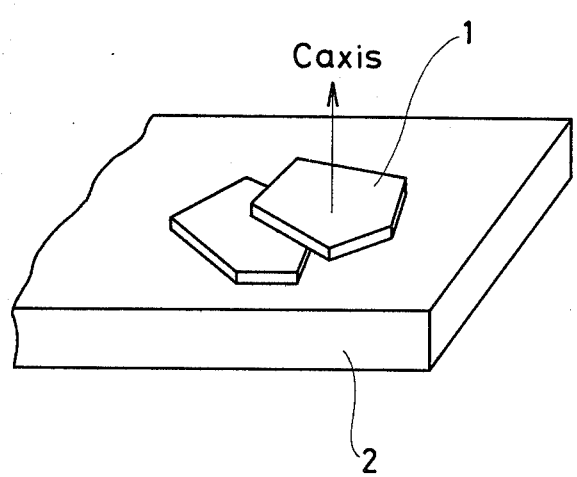
FIG. 2 is a view showing the orientation of the talc particles within a raw material during extruding.

We inventors have made various studies and experiments to obtain a cordierite body exhibiting a more excellent low thermal expansion property and to promote the sintering in the firing step of the cordierite body.

As a result, we have found that by mixing and kneading a batch raw material containing halloysite particles used as kaolin minerals, and talc particles which are delaminated like platelets along the (001) plane, by subjecting the mixed raw material to anisostatic forming such as extrusion forming so as to impart a planar orientation to the platelet shaped talc particles therein and by drying and firing the obtained green body, a cordierite body having high crystallinity can be obtained at a relatively low firing temperature.

And furthermore, we have found that by using the above described production method, a cordierite body of which the coefficient of thermal expansion is less than $10.0 \times 10^{-7}/°C.$ in a specific direction can be obtained.

The important points of the present invention are that plate-shaped talc particles contained within the batch raw material impart a low thermal expansion property to the obtained cordierite body, and that halloysite contained within the batch raw material promotes the sintering of the cordierite body.

Namely, when talc ($3MgO.4SiO_2.H_2O$) is broken, it is generally delaminated into plate-shaped particles along the (001) plane perpendicular to the C-crystal axis thereof. And when the batch raw material containing these plate-shaped talc particles is extruded by means of an extrusion die, the plate-shaped talc particles 1 align themselves while the batch raw material passes thin slits of the extrusion die, and the plate-shaped talc particles 1 are oriented in the plane along the surface of the sheet-shaped extruded green body 2.

The cordierite body obtained by drying and firing the extruded green body exhibits very excellent low thermal expansion property in a direction along the surface thereof.

This result shows that the cordierite body exhibits a low thermal expansion property in the direction parallel with the (001) plane of the talc particles.

Next, halloysite is expressed by the chemical formula of $Al_2O_3.2SiO_2.4H_2O$ which is similar to that of kaolinite ($Al_2O_3.2SiO_2.2H_2O$). However, crystallinity of halloysite is lower than that of kaolinite. And a typical form of a halloysite crystal is a tubular form.

When the batch raw material containing halloysite is fired, the cordierite body having excellent crystallinity can be obtained at a relatively lower firing temperature as compared with the case wherein other kaolin minerals such as kaolinite are used. It is recognized that the weaker chemical bonding and the lower crystallinity of halloysite than those of kaolinite have a beneficial effect in the sintering reaction of the cordierite body.

In the present invention, halloysite includes metahalloysite and endellite, allophane and the like all of which are formed in the process that the halloysite crystals grow.

The method for producing a cordierite body of the present invention can be effectively applied to the method for producing a honeycomb shaped catalyst support for purifying exhaust gases, which has a large number of axially extending open ended cells surrounded by thin wall as shown in FIG. 1.

The honeycombed structure having such a structure as described above is generally formed by extruding the raw material by means of a die having thin slits. When the batch raw material of the present invention passes through the slits of the die, plate-shaped talc particles are oriented along the surface of the wall of the extruded honeycombed structure. And in the catalyst support which was obtained by firing the extruded honeycombed structure, the orientation of c-axes is imparted to the direction along the surface of the wall thereof, that is to the direction perpendicular to the direction of wall thickness.

Therefore, the obtained catalyst support has a remarkably low thermal expansion property in the direction along the surface of thin wall thereof and also has good thermal shock resistance.

The thermal expansion property of the direction of wall thickness is inferior to that of the direction along the surface of thin wall, but since the wall of the honeycombed structure is very thin and there are open ended cells adjacent to the wall, which absorb the thermal expansion thereof, the wall is not in danger of being broken or cracked due to repeated cycles of temperature change.

DETAILED DESCRIPTION OF THE INVENTION

Hereinafter, the present invention will be explained in detail based on experiments.

EXPERIMENT 1

The raw material having such chemical composition (weight %) as listed in Table 1 was mixed in the mixing ratio (weight %) as shown in Table 2. Then, binder and water were added to the mixed raw material and were mixed therewith to obtain a batch raw material.

The obtained batch raw material was extruded by means of an extrusion die for forming a honeycomb structure having 300 cells per square inch and a slit width of 0.30 mm.

After drying, the extruded honeycomb structure was fired at up to 1400° C. for 5 hours to obtain a cordierite honeycomb structure.

From the obtained cordierite honeycomb structure, samples having a diameter of 10$\phi$ and a length of 50 mm were cut and thermal expansion coefficients thereof were examined in a direction parallel to the extruding direction along the surface thereof in the range of 25° to 1000° C.

As a talc, plate-shaped talc particles which were obtained by pulverizing talc to be delaminated along the (001) plane thereof were used.

The fired talc was obtained by previously firing the above described plate-shaped talc particles at 1200° C. for 2 hours.

As the halloysite, tubular halloysite particles were used and as the kaolinite, plate-shaped kaolinite particles were used. And in Table 1, Ig loss shows ignition loss.

The experimental results are shown in Table 2. Samples A to G were subjected to the method of the present invention and samples H and I were subjected to the conventional method in order to present comparative data. In each of the samples, the thermal expansion coefficient was as low as less than $10.5 \times 10^{-7}/°C$.

EXPERIMENT 2

The raw materials having the same composition ratios as those of Samples A and G and comparative Samples H and I shown in Table 2 were prepared.

Each raw material was extruded and dried in the same method as that of Experiment 1.

And the dried honeycomb structures were fired for 5 hours at the firing temperature ranging from 1340° C. to 1460° C. at 20° C. intervals. And the thermal expansion coefficients thereof were examined by the same method as that of Experiment 1.

Figure 3:
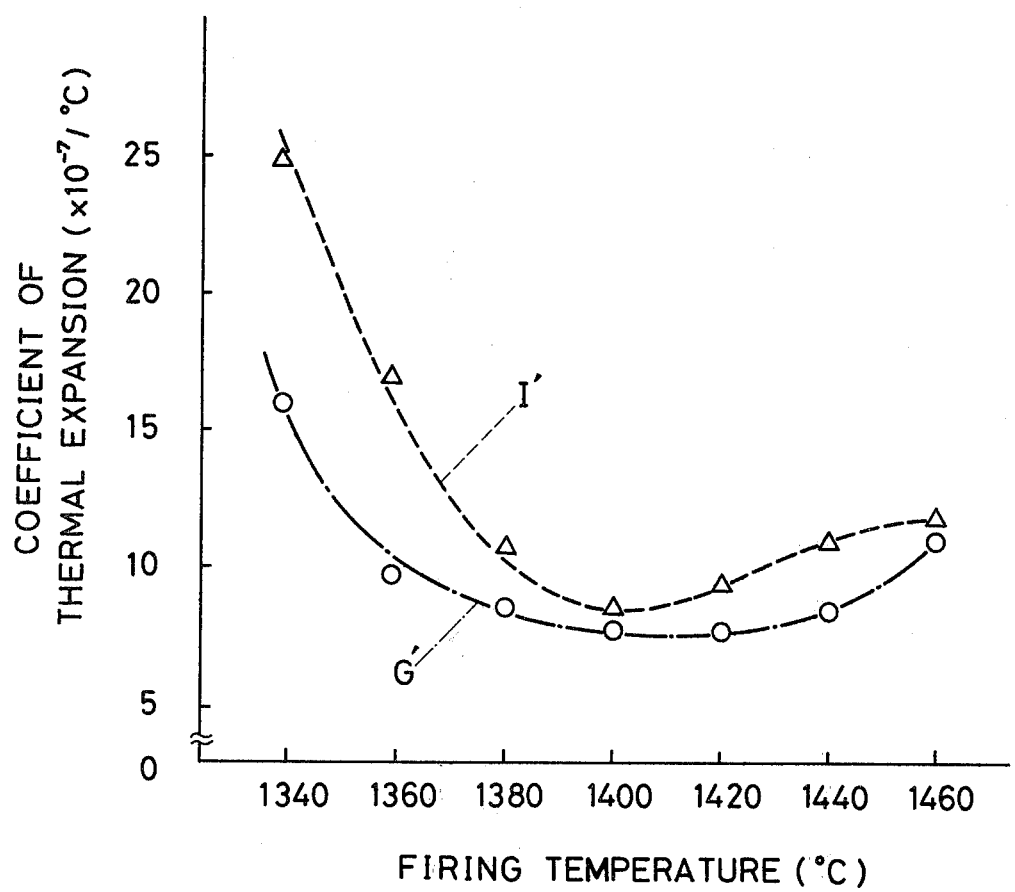
FIG. 3 is a graph showing an experimental result of the present invention.

The experimental results are shown in Table 3 and FIG. 3. In Table 3, Samples A' and G' have the same composition ratios as those of Samples A and G in Experiment 1, respectively. And Samples H' and I' have the same composition ratios as those of Samples H and I in Experiment 1. In FIG. 3, Mark ○ and line G' show the experimental result of Sample G' and Mark △ and line I' show that of Sample I'.

As is apparent from Experiment 2, Samples A' and G' containing halloysite show lower thermal expansion values at a lower firing temperature as compared with Samples H' and I'.

Furthermore, the shrinkage rate $$\left( \frac{\text{size after being dried} - \text{size after being fired}}{\text{size after being dried}} \right)$$

of the obtained honeycomb structure of each samples was examined.

The shrinkage rate of samples containing raw talc was about 3.0% and that of samples containing prefired talc was about 1.8%. The prefired talc was obtained by previously firing the plate-shaped talc particles at a temperature from 900° C. to 1400° C.

From the above described experimental results, it is clear that by using plate-shaped talc particles as talc to be contained within the cordierite batch raw material, a honeycomb structured cordierite body having a remarkably low thermal expansion property along the surface thereof can be obtained.

And it is also clear that by using halloysite as the source of kaolin minerals together with the plate-shaped talc particles, a honeycomb structured cordierite body having an excellent low thermal expansion property can be obtained at a lower firing temperature as compared with that containing kaolinite.

Furthermore, it is also clear that by using prefired talc as the plate-shaped talc particles, a honeycomb structured cordierite body having an excellent size accuracy can be obtained with little shrinkage during the firing step.

TABLE 1

| Composition | Materials | | | | | |
|---|---|---|---|---|---|---|
| | Raw Talc | Prefired Talc | Halloysite | Aluminum Hydroxide | Alumina | Kaolinite |
| $SiO_2$ | 63.00 | 66.05 | 48.80 | 0.02 | 0.02 | 49.30 |

TABLE 1-continued

| | Materials | | | | | |
|---|---|---|---|---|---|---|
| Composition | Raw Talc | Prefired Talc | Halloysite | Aluminum Hydroxide | Alumina | Kaolinite |
| Al$_2$O$_3$ | 0.10 | 0.10 | 36.50 | 65.13 | 99.50 | 36.00 |
| MgO | 31.70 | 33.23 | 0.04 | — | — | 0.08 |
| Fe$_2$O$_3$ | 0.03 | 0.03 | 0.28 | 0.01 | 0.01 | 0.28 |
| TiO$_2$ | — | — | 0.08 | — | — | 1.76 |
| CaO | 0.03 | 0.03 | 0.04 | — | — | 0.04 |
| K$_2$O | — | — | 0.02 | 0.43 | 0.43 | 0.01 |
| Na$_2$O | — | — | 0.07 | — | — | 0.03 |
| Ig loss | 4.58 | — | 14.04 | 34.45 | — | 13.25 |
| Average Particle Diameter ($\mu$) | 2.8 ~ 30 | 1.3 ~ 28 | 0.78 | 1.2 | 1.0 | 2.6 |

TABLE 2

| | Materials | Experiment | | | | | | | | |
|---|---|---|---|---|---|---|---|---|---|---|
| | | A | B | C | D | E | F | G | H | I |
| Composition Ratio | Raw Talc | 36.43 | 39.38 | — | — | 17.94 | 19.41 | 18.41 | 36.33 | 18.37 |
| | Prefired Talc | — | — | 35.34 | 38.26 | 17.94 | 19.41 | 18.41 | — | 18.37 |
| | Kaolinite | — | — | — | — | — | — | — | 41.46 | 42.95 |
| | Halloysite | 41.86 | 45.26 | 42.58 | 46.09 | 42.22 | 45.68 | 43.34 | — | — |
| | Aluminum Hydroxide | 21.71 | — | 22.08 | — | 21.90 | — | 14.84 | 22.21 | 15.19 |
| | Alumina | — | 15.36 | — | 15.65 | — | 15.50 | 5.00 | — | 5.12 |
| Coefficient of Thermal Expansion ($\times 10^{-7}$/°C.) | | 6.7 | 8.0 | 9.4 | 10.5 | 7.2 | 8.3 | 7.8 | 7.7 | 8.4 |

TABLE 3

| Coefficient of Thermal Expansion | Firing Temperature | | | | | | |
|---|---|---|---|---|---|---|---|
| | 1340° C. | 1360° C. | 1380° C. | 1400° C. | 1420° C. | 1440° C. | 1460° C. |
| Experiment A' | 15.2 | 9.5 | 7.2 | 6.7 | 7.8 | 9.2 | 12.5 |
| Experiment G' | 15.9 | 9.8 | 8.6 | 7.8 | 7.6 | 8.4 | 11.0 |
| Experiment H' | 23.6 | 15.7 | 10.2 | 7.7 | 9.6 | 11.4 | 13.6 |
| Experiment I' | 25.0 | 16.8 | 10.7 | 8.4 | 9.4 | 10.9 | 11.8 |

Having now fully described the invention, it will be apparent to one of ordinary skill in the art that many changes and modifications can be made thereto without departing from the spirit or scope of the invention as set forth herein.

What is claimed is:

1. A method of producing a cordierite body having a coefficient of thermal expansion of less than $10.5 \times 10^{-7}$/°C. comprising the steps of:
   (1) mixing together and kneading a batch raw material containing tubular-shaped halloysite particles and plate-shaped talc particles delaminated along the (OOl) plane thereof,
   said halloysite particles including at least one material selected from the group consisting of halloysite, metahalloysite, endellite and allophane;
   (2) anisostatically forming the mixed batch raw material into a formed body thereby imparting a planar orientation to said plate-shaped talc particles contained in said batch raw material; and
   (3) drying and firing the thus formed body.

2. A method of producing a cordierite body from a batch raw material containing a kaolin mineral and talc, comprising the steps of:
   (1) mixing together and kneading a batch raw material containing halloysite particles and plate-shaped talc particles,
   said halloysite particles including at least one material selected from the group consisting of halloysite, metahalloysite, endellite and allophane;
   (2) anisostatically forming the mixed batch raw material into a formed body thereby imparting a planar orientation to said plate-shaped talc particles contained in said batch raw material; and
   (3) drying and firing the thus formed body.

3. The method according to claim 2 in which the talc particles are delaminated along the (001) plane thereof.

4. The method according to claim 2 in which the plate-shaped talc particles are prepared prior to step (1) by the additional steps of: (a) delaminating talc particles along the (OOl) plane thereof, and (b) firing the delaminated particles.

5. The method of claim 4 in which the firing temperature of step (b) from about 900° C. to about 1400° C.

6. The method according to claim 2 in which the halloysite particles are tubular shaped forms.

7. The method according to claim 2 in which the anisostatic forming of step (2) is performed by extrusion forming.

8. The method according to claim 2 in which the firing of step (3) is at a temperature about 1340° C. to about 1460° C.

9. The method according to claim 2 in which the batch raw material mixed in step (1) further contains at least one of aluminum hydroxide, alumina or silica.

10. The method according to claim 2 in which the talc particles have an average diameter of 2.8 to 30.0 microns.

11. The method according to claim 10 in which the talc particles have an average diameter of 1.3 to 28.0 microns.

12. The method according to claim 2 in which the resulting cordierite body has a coefficient of thermal expansion of less than $10.5 \times 10^{-7}$/°C. in one direction.

13. The method according to claim 6 in which the resulting cordierite body has a coefficient of thermal expansion of less than $10.5 \times 10^{-7}$/°C. in one direction.

* * * * *